US009481161B2

(12) United States Patent
Choi et al.

(10) Patent No.: US 9,481,161 B2
(45) Date of Patent: Nov. 1, 2016

(54) SUBSTRATE DETACHING APPARATUS

(71) Applicant: Samsung Display Co., Ltd., Yongin-si, Gyeonggi-Do (KR)

(72) Inventors: Hyun Hwan Choi, Daejeon (KR); Myung Hwan Park, Suwon-si (KR); Kun Hee Jo, Yongin-si (KR); Man Hong Na, Seoul (KR); Seung-Jin Baek, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/919,298

(22) Filed: Oct. 21, 2015

(65) Prior Publication Data

US 2016/0243811 A1    Aug. 25, 2016

(30) Foreign Application Priority Data

Feb. 25, 2015    (KR) .................. 10-2015-0026802

(51) Int. Cl.
*B32B 38/10*    (2006.01)
*B32B 43/00*    (2006.01)
*B25B 11/00*    (2006.01)

(52) U.S. Cl.
CPC ........... *B32B 43/006* (2013.01); *B25B 11/005* (2013.01); *B32B 2315/08* (2013.01); *Y10T 156/1132* (2015.01); *Y10T 156/1944* (2015.01)

(58) Field of Classification Search
CPC ............... B32B 38/10; B32B 43/006; Y10T 156/1132; Y10T 156/1994; B25B 11/005
USPC .................... 156/707, 758, 924, 937; 269/21
See application file for complete search history.

(56) References Cited

U.S. PATENT DOCUMENTS

| 4,296,542 | A | * | 10/1981 | Gotman | ............... | B28D 5/0029 225/94 |
| 4,448,404 | A | * | 5/1984 | Ogawa | .................. | B25B 11/005 269/21 |
| 4,921,564 | A | * | 5/1990 | Moore | ............. | H01L 21/67132 156/701 |
| 5,609,377 | A | | 3/1997 | Tanaka | | |
| 6,123,800 | A | * | 9/2000 | Freund | ............. | H01L 21/67132 156/707 |
| 6,271,676 | B1 | * | 8/2001 | Montoya | ............. | H01L 21/6838 279/3 |
| 9,166,191 | B2 | | 10/2015 | Yoon | | |

(Continued)

FOREIGN PATENT DOCUMENTS

JP           2010-058869 A     3/2010
KR    10-2008-0079240 A     8/2008

*Primary Examiner* — Mark A Osele
*Assistant Examiner* — Nickolas Harm
(74) *Attorney, Agent, or Firm* — Robert E. Bushnell, Esq.

(57) ABSTRACT

The present invention aims at reducing a breaking phenomenon of an adsorbed substrate while the substrate is detached from a lower plate at a high speed. An embodiment is a substrate detaching apparatus including an adsorption main body disposed on one side of the adsorbed substrate to generate an adsorption force; and a plurality of adsorption parts provided in a predetermined adsorption region of the substrate under the adsorption main body, being spaced apart from each other and applied with an adsorption force from the adsorption main body to adsorb the substrate, wherein the adsorption region includes an outer region of a first cycloid curved line protruding in a third corner direction based on a diagonal connecting between a first corner and a second corner of the adsorbed substrate and an outer region of a second cycloid curved line protruding in a fourth corner direction.

17 Claims, 6 Drawing Sheets

(56) References Cited

U.S. PATENT DOCUMENTS

| | | | | |
|---|---|---|---|---|
| 2011/0084377 A1* | 4/2011 | Chien | H01L 21/67132 | 257/692 |
| 2011/0088845 A1* | 4/2011 | Chong | H01L 21/67011 | 156/761 |
| 2011/0297329 A1* | 12/2011 | Canale | H01L 21/67092 | 156/756 |
| 2012/0168091 A1* | 7/2012 | Kell | H01L 21/67092 | 156/707 |
| 2013/0327484 A1* | 12/2013 | Hirakawa | H01L 21/67092 | 156/711 |
| 2014/0262053 A1* | 9/2014 | Canale | H01L 21/67092 | 156/707 |
| 2014/0332150 A1* | 11/2014 | Hirakata | B32B 38/10 | 156/247 |

* cited by examiner

US 9,481,161 B2

SUBSTRATE DETACHING APPARATUS

CLAIM OF PRIORITY

This application claims the priority to and all the benefits accruing under 35 U.S.C. §119 of Korean Patent Application No. 10-2015-0026802 filed in the Korean Intellectual Property Office (KIPO) on Feb. 25, 2015, the entire contents of which are incorporated herein by reference.

BACKGROUND OF THE INVENTION

1. Field of Disclosure

The present invention relates to a substrate detaching apparatus.

2. Description of the Related Art

Generally, a substrate detaching apparatus uses a method of detaching a glass upper plate from a glass lower plate by compressing several adsorption parts to the glass upper plate. For example, there is a method of lifting up the glass upper plate while sequentially compressing the glass upper plate from an outermost adsorption part. According to the method, after one side of a corner of the glass upper plate is subjected to an initial peeling process, a substrate is detached while the whole glass upper plate is lifted up. Several adsorption parts are arranged up to an inner side along each side direction of the glass upper plate. As a result, an angle of a detached surface between the glass upper plate and the glass lower plate may be made to be large. Recently, in display devices such as an organic light emitting diode display and a liquid crystal display, a thickness of a flat panel is getting thinner. As the thickness of the flat panel is reduced, it needs a lot of care at the time of detaching the glass upper plate from the glass lower plate in the process of manufacturing the flat panel.

In this state, in the case of increasing a detaching speed of the glass upper plate, a stress due to an adhesion between glasses is strongly applied to an interface between the glass upper plate and the glass lower plate and thus the glass upper plate may be broken. For this reason, a detaching speed of the glass upper plate is slow and a detaching yield of the glass upper plate is low.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a substrate detaching apparatus having advantages of reducing a breaking phenomenon of a glass upper plate while the glass upper plate is being detached at a high speed.

An exemplary embodiment of the present invention provides a substrate detaching apparatus, including an adsorption main body disposed on one side of an adsorbed substrate to generate an adsorption force; and a plurality of adsorption parts provided in a predetermined adsorption region under the adsorption main body, while being spaced apart from each other and applied with an adsorption force from the adsorption main body to adsorb the adsorbed substrate, wherein the adsorption region includes an outer region of a first cycloid curved line protruding in a third corner direction based on a diagonal connecting between a first corner and a second corner of the adsorbed substrate and an outer region of a second cycloid curved line protruding in a fourth corner direction.

The adsorbed substrate may include a glass upper plate and a glass lower plate which face-adheres to each other. The plurality of adsorption parts may adsorb at least any one of the glass upper plate and the glass lower plate. The plurality of adsorption parts may adsorb only the glass upper plate.

The plurality of adsorption parts may not be positioned on the diagonal and may be arranged not to be positioned in an inner region of the first cycloid curved line and an inner region of the second cycloid curved line. The plurality of adsorption parts may be positioned along each side of the glass upper plate in the outer region of the first cycloid curved line and the outer region of the second cycloid curved line. The plurality of adsorption parts may be positioned on the first cycloid curved line or the second cycloid curved line. The plurality of adsorption parts may be positioned around the first corner and the second corner on the diagonal. The plurality of adsorption parts may be positioned along each side of the glass upper plate in the outer region of the first cycloid curved line and the outer region of the second cycloid curved line. The plurality of adsorption parts may be positioned on the first cycloid curved line or the second cycloid curved line. The plurality of adsorption parts may not be positioned on the diagonal.

The adsorption part may include a vacuum pad and the substrate detaching apparatus may further include an adsorption support part having one side coupled with a lower portion of the adsorption main body and the other side coupled with the adsorption part to support the adsorption part and transferring the adsorption force of the adsorption main body to the adsorption part.

According to an exemplary embodiment of the present invention, it is possible to minimize the breaking phenomenon which occurs at the time of detaching the glass upper plate.

Further, it is possible to rapidly detach the glass upper plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Terminologies used herein are to mention only a specific exemplary embodiment, and are not to limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1A:
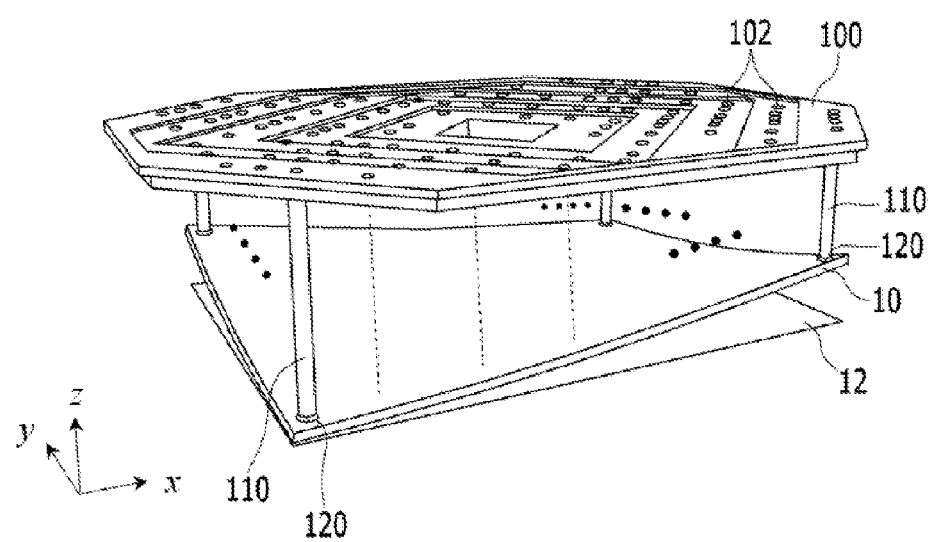
FIG. 1A is a diagram illustrating a substrate detaching apparatus according to an exemplary embodiment of the present invention.

FIG. 1A is a diagram illustrating a substrate detaching apparatus according to an exemplary embodiment of the present invention. Referring to FIG. 1A, according to an exemplary embodiment of the present invention, a substrate detaching apparatus includes an adsorption main body 100, an adsorption part 120, and an adsorption support part 110.

Figure 1B:
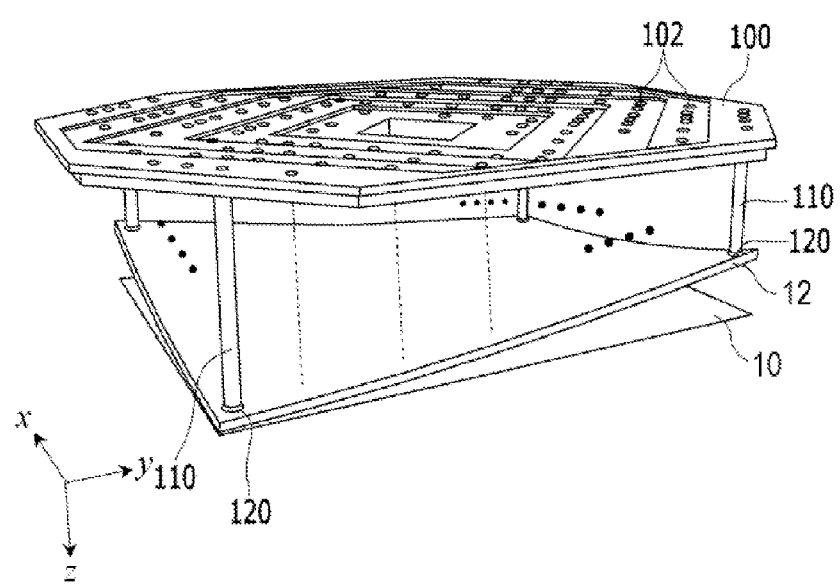
FIG. 1B is a diagram illustrating a substrate detaching apparatus according to another exemplary embodiment of the present invention.
Figure 1C:
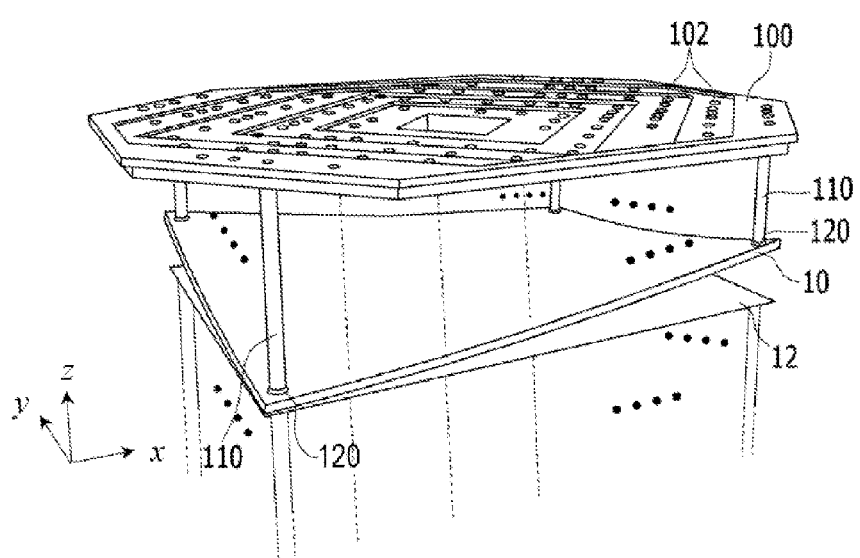
FIG. 1C is a diagram illustrating a substrate detaching apparatus according to yet another exemplary embodiment of the present invention.

The adsorption main body 100 is disposed at one side of adsorbed substrates 10 to generate an adsorption force. Adsorption holes 102 which communicate with a plurality of adsorption parts 120 are arranged on one surface of the adsorption main body 100 in a predetermined form in advance. The adsorbed substrates 10 may include a rectangular glass upper plate 10 and a rectangular glass lower plate 12 which face-adheres to each other. The plurality of adsorption parts 120 is provided to be adsorbed into at least any one of the glass upper plate 10 and the glass lower plate 12 and the plurality of adsorption parts 120 according to the exemplary embodiment of the present invention shown in FIG. 1A may be provided to be adsorbed into only the glass upper plate 10. FIG. 1B shows an embodiment in which the plurality of adsorption parts 120 may be provided to be adsorbed into only the glass lower plate 12. FIG. 1C shows an embodiment in which the plurality of adsorption parts 120 may be provided to be adsorbed into both the glass upper plate 10 and the glass lower plate 12; and the arrangements of the plurality of adsorption parts 120 adsorbed on the glass upper plate 10 may be symmetrical or nonsymmetrical to the arrangement of adsorption parts 120 adsorbed on the glass lower substrate 12 with respect to the interface between the glass upper substrate 10 and the glass lower substrate 12.

The plurality of adsorption parts 120 are provided only in a predetermined adsorption region under the adsorption main body 100, while being spaced apart from each other and is applied with the adsorption force from the adsorption main body 100 to adsorb the glass upper plate 10. The plurality of adsorption parts 120 may include a cup-shaped vacuum pad. In this case, the plurality of adsorption parts 120 have intake ports provided at the substrate and an adsorbed portion contacting the substrate and may be formed as a vacuum pad which has a check valve for opening and closing the intake ports provided therein. Further, the adsorption main body 100 may have a structure which is applied with a vacuum force from a vacuum apparatus (not illustrated) and may be provided with connection members which are applied with a vacuum force. The plurality of adsorption parts 120 are arranged in a predetermined region under the adsorption main body 100 and may serve to adsorb the substrate when a vacuum force is supplied from the adsorption main body 100.

The adsorption support part 110 may be provided in plural, in which one side of the adsorption support parts 110 may be coupled with the plurality of adsorption holes 102 to communicate with the plurality of adsorption holes 102, respectively in the lower portion of the adsorption main body 100, and the other side thereof is coupled with the plurality of adsorption parts 120, respectively, to support the plurality of adsorption parts 120 which may be formed as a pipe through which the adsorption force of the adsorption main body 100 is transferred to the plurality of adsorption parts 120. That is, the adsorption support part 110 is disposed between the adsorption main body 100 and the adsorption part 120 and transfers a vacuum force to the adsorption part 120 when being applied with the vacuum force through the adsorption main body 100 connected to the vacuum apparatus. Meanwhile, the adsorption main body 100, the adsorption support part 110, and the like may have a configuration which is used in the existing substrate detaching apparatus and therefore the detailed description thereof will be omitted.

Figure 2:
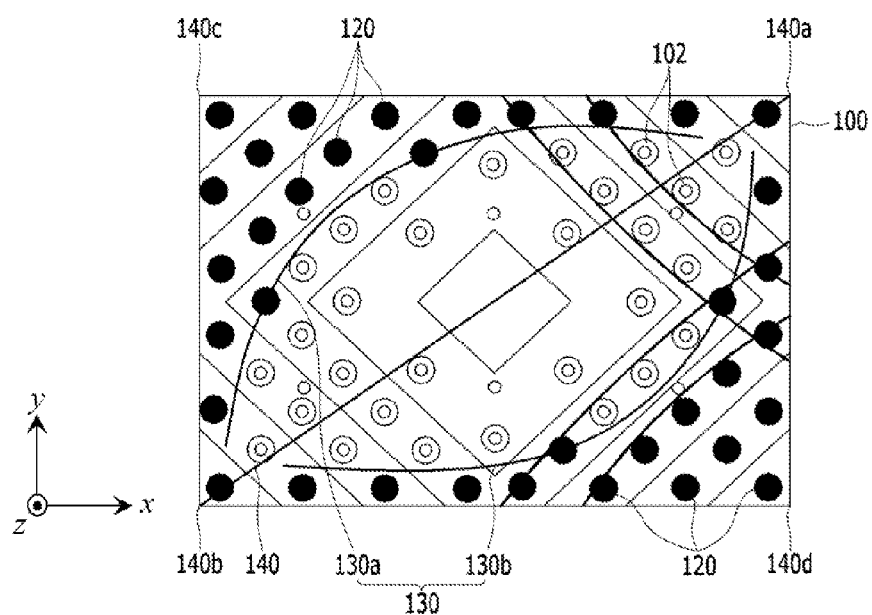
FIG. 2 is a diagram illustrating an adsorption area of a plurality of adsorption parts.
Figure 3:
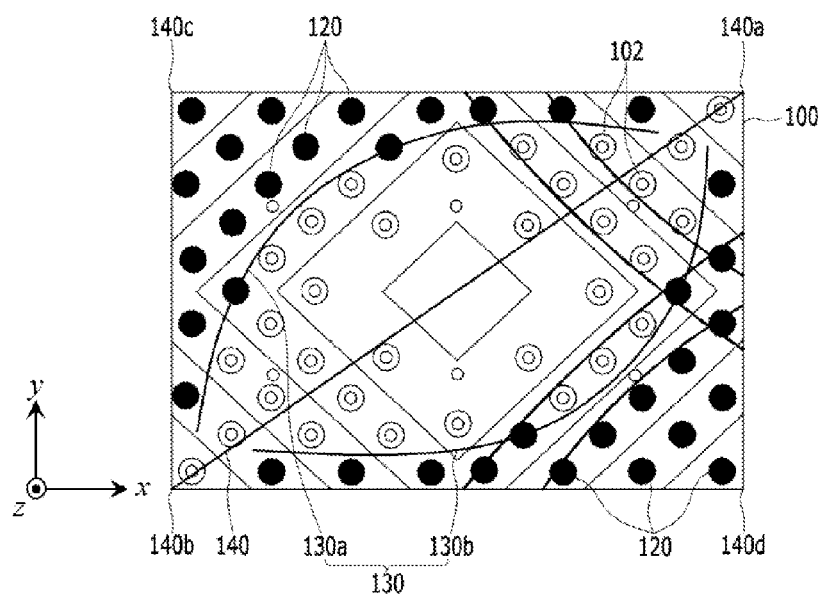
FIGS. 3 and 4 are diagrams differently illustrating an adsorption area of a plurality of adsorption parts.
Figure 4:
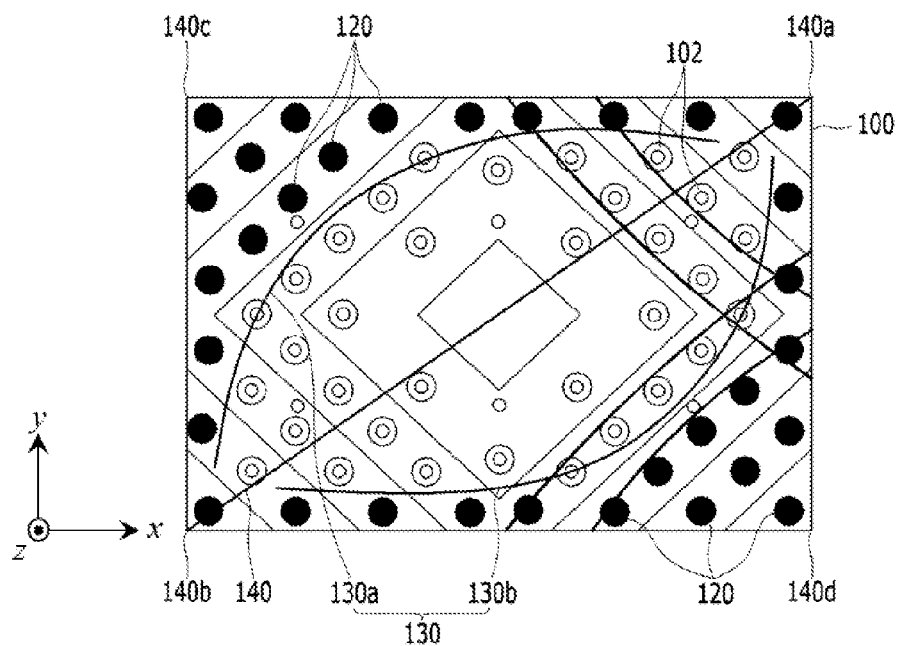

FIG. 2 is a diagram illustrating the adsorption region of the plurality of adsorption parts 120 and FIGS. 3 and 4 are diagrams differently illustrating an adsorption area of a plurality of adsorption parts 120. FIGS. 2 to 4 illustrate only the region corresponding to the glass upper plate 10 in the adsorption main body 100 provided with the plurality of adsorption parts 120. Therefore, the adsorption main body 100 may be described as the glass upper plate 10. First, referring to FIG. 2, the plurality of adsorption parts 120 may be arranged only in the predetermined adsorption region. For example, the adsorption region of the plurality of adsorption parts 120 may include outer regions of cycloid curved lines 130 which are disposed along both corner directions based on a diagonal 140 connecting from a first corner 140a positioned at a right upper of the glass upper plate 10 to a second corner 140b positioned at a left lower of the glass upper plate 10. The cycloid curved line 130 may include a first cycloid curved line 130a and a second cycloid curved line 130b which are disposed at both sides based on the diagonal connecting between the first corner 140a and the second corner of the glass upper plate 10. Therefore, the adsorption region of the plurality of adsorption parts 120 may include an outer region of the first cycloid curved line 130a protruding in a third corner 140c direction and an outer region of the second cycloid curved line 130b protruding in a fourth corner 140d direction.

Meanwhile, an inner region of the cycloid curved line 130 may be formed as a non-adsorption region. For example, as illustrated in FIG. 2, the plurality of adsorption parts 120 are not adsorbed in the inner region of the cycloid curved line 130 including the diagonal. The plurality of adsorption parts 120 may be arranged so as not to be positioned in the inner region of the first cycloid curved line 130a and the inner region of the second cycloid curved line 130b which are arranged in a bow-shaped curved line in both corner directions of the glass upper plate 10 in an adsorption region in a third corner 140c direction and a fourth corner 140d direction which are disposed based on the diagonal 140. That is, the plurality of adsorption parts 120 may adsorb the glass upper plate 10 along the bow-shaped curved lines 130a and 130b which are disposed in both corner directions based on the diagonal 140 of the glass upper plate 10. For example, the plurality of adsorption parts 120 may be arranged to adsorb the glass upper plate in the outer region of the first cycloid curved line 130*a* and the outer region of the second cycloid curved line 130*b*. Further, the plurality of adsorption parts 120 may also be arranged along each side based on the diagonal 140 of the glass upper plate 10. As a result, an angle of a detached surface between the glass upper plate 10 and the glass lower plate 10 may be made to be small. In this state, even though a detaching speed is increased, a stress due to an adhesion between the glasses may be weakly applied to an interface between the glass upper plate 10 and the glass lower plate 12. For this reason, a breaking phenomenon of the glass upper plate 10 is reduced while the glass upper plate 10 is detached and the glass upper plate 10 may be detached at a high speed.

Meanwhile, the plurality of adsorption parts 120 may not be adsorbed in the inner region of the cycloid curved line 130 including the diagonal 140 and may be provided at a portion arranged in a row in each side direction of the glass upper plate 10 in the adsorption regions which are disposed at both sides based on the diagonal 140. That is, the plurality of adsorption parts 120 are not arranged on the diagonal 140 of the other side in the glass upper plate 10 and may be arranged in a row in each side direction based on the diagonal 140 of the glass upper plate 10. The plurality of adsorption parts 120 may be formed along outer sides of each corner of the glass upper plate 10 at both sides along the diagonal 140 of the glass upper plate 10 to adsorb the glass upper plate 10.

Referring to FIG. 3, the plurality of adsorption parts 120 are not adsorbed in the inner region of the cycloid curved line 130 including the diagonal 140 and may be provided only at a portion arranged in the bow-shaped curved line in both side corner directions of the glass upper plate 10 in the adsorption regions which are disposed at both sides based on the diagonal 140. That is, the plurality of adsorption parts 120 are not positioned on the diagonal 140. Further, the plurality of adsorption parts 120 may be provided at a portion arranged in a row in each side direction of the glass upper plate 10 in the adsorption regions in which are disposed based on the diagonal 140. That is, the plurality of adsorption parts 120 may be arranged to adsorb the glass upper plate 10 in the outer region of the first cycloid curved line 130*a* and the outer region of the second cycloid curved line 130*b*. Further, the plurality of adsorption parts 120 may adsorb the glass upper plate in a row along each side direction of the glass upper plate 10 based on the diagonal 140 of the glass upper plate 10. Further, the plurality of adsorption parts 120 may also be arranged to adsorb the glass upper plate 10 on the first cycloid curved line 130*a* or the second cycloid curved line 130*b* based on the diagonal 140 of the glass upper plate 10.

Referring to FIG. 4, the plurality of adsorption parts 120 may be provided at a portion arranged in a row in each side direction of the glass upper plate 10 in the adsorption regions in which are disposed based on the diagonal 140. If necessary, the plurality of adsorption parts 120 may be positioned around the first corner 140*a* and the second corner 140*b* on the diagonal 140. Further, the plurality of adsorption parts 120 may be provided only at a portion arranged in the bow-shaped curved line in both corner directions of the glass upper plate 10 in the adsorption regions in which are disposed based on the diagonal 140. That is, the plurality of adsorption parts 120 may be arranged to adsorb the glass upper plate 10 in the outer region of the first cycloid curved line 130*a* and the outer region of the second cycloid curved line 130*b*. Therefore, the plurality of adsorption parts 120 may adsorb the glass upper plate 10 in the adsorption regions formed at both corners along the bow-shaped curved line based on the diagonal 140 of the glass upper plate 10 and may adsorb the glass upper plate 10 in a row along each side direction of the glass upper plate 10 based on the diagonal 140 of the glass upper plate 10.

As described above, according to the exemplary embodiment of the present invention, the plurality of adsorption parts 120 may be arranged along the cycloid curved line 130 which reckons the diagonal 140 of the other side as an end point on the basis of a least action rule at both corners based on the diagonal 140 of the glass upper plate 10. That is, the plurality of adsorption parts 120 according to the exemplary embodiment of the present invention are formed along the outer side of the corners of the glass upper plate 10 and may have an arrangement of a form (a row or a curved line) in which they are disposed at both sides based on the diagonal 140 of the glass upper plate 10.

According to the exemplary embodiment of the present invention, it is possible to minimize the breaking phenomenon which occurs at the time of detaching the glass upper plate 10 and rapidly detach the glass upper plate 10 by using the arrangement of the plurality of adsorption parts 120 which is efficient to detach the glass upper plate 10. For example, the glass upper plate 10 having a thickness of 0.1 t (where t means "mm" in thickness of a glass substrate) may also be subjected to a primary detachment and a secondary detachment without the breaking phenomenon due to the stress. However, the arrangement of the plurality of adsorption parts 120 is not limited to the exemplary embodiment of the present invention and even though the arrangement of the plurality of adsorption part 120 is different, the arrangement of the plurality of adsorption parts 120 which may be efficient to minimize the breaking phenomenon occurring at the time of detaching the glass upper plate 10 and rapidly detach the glass upper plate 10 may be variously changed in a design.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Glass upper plate
12: Glass lower plate
100: Adsorption main body
102: Adsorption hole
110: Adsorption support part
120: Adsorption part
130: Cycloid curved line
140: Diagonal

What is claimed is:
1. A substrate detaching apparatus, comprising:
an adsorption main body disposed on one side of an adsorbed substrate to generate an adsorption force; and
a plurality of adsorption parts provided in a predetermined adsorption region of the adsorbed substrate under the adsorption main body, while being spaced apart from each other and applied with an adsorption force from the adsorption main body to adsorb the adsorbed substrate, wherein the adsorption region includes an outer region of a first cycloid curved line protruding in a third corner direction based on a diagonal connecting between a first corner and a second corner of the adsorbed substrate and an outer region of a second cycloid curved line protruding in a fourth corner direction.

2. The substrate detaching apparatus of claim 1, wherein the adsorbed substrate includes a glass upper plate and a glass lower plate which face-adheres to the glass upper plate.

3. The substrate detaching apparatus of claim 2, wherein the plurality of adsorption parts adsorb at least one of the glass upper plate and the glass lower plate.

4. The substrate detaching apparatus of claim 3, wherein the plurality of adsorption parts adsorb only the glass upper plate.

5. The substrate detaching apparatus of claim 3, wherein the plurality of adsorption parts are adsorbed on the glass lower plate.

6. The substrate detaching apparatus of claim 3, wherein the plurality of adsorption parts are adsorbed on the glass upper plate and the glass lower plate.

7. The substrate detaching apparatus of claim 6, wherein arrangement of the adsorption parts adsorbed on the glass upper plate is symmetrical with arrangement of the adsorption parts adsorbed on the glass lower plate, with respect to interface between the glass upper plate and the glass lower plate.

8. The substrate detaching apparatus of claim 6, wherein arrangement of the adsorption parts adsorbed on the glass upper plate is nonsymmetrical with arrangement of the adsorption parts adsorbed on the glass lower plate, with respect to interface between the glass upper plate and the glass lower plate.

9. The substrate detaching apparatus of claim 1, wherein the plurality of adsorption parts are not positioned on the diagonal and are not positioned in an inner region of the first cycloid curved line and an inner region of the second cycloid curved line.

10. The substrate detaching apparatus of claim 9, wherein the plurality of adsorption parts are positioned along each side of the glass upper plate in the outer region of the first cycloid curved line and the outer region of the second cycloid curved line.

11. The substrate detaching apparatus of claim 9, wherein the plurality of adsorption parts are positioned on one of the first cycloid curved line and the second cycloid curved line.

12. The substrate detaching apparatus of claim 1, wherein the plurality of adsorption parts are positioned around the first corner and the second corner on the diagonal.

13. The substrate detaching apparatus of claim 12, wherein the plurality of adsorption parts are positioned along each side of the glass upper plate in the outer region of the first cycloid curved line and the outer region of the second cycloid curved line.

14. The substrate detaching apparatus of claim 13, wherein the plurality of adsorption parts are positioned on one of the first cycloid curved line and the second cycloid curved line.

15. The substrate detaching apparatus of claim 1, wherein the plurality of adsorption parts are not positioned on the diagonal.

16. The substrate detaching apparatus of claim 1, wherein the adsorption part includes a vacuum pad.

17. The substrate detaching apparatus of claim 16, further comprising an adsorption support part having one side coupled with a lower portion of the adsorption main body and the other side coupled with the adsorption part to support the adsorption part and transferring the adsorption force of the adsorption main body to the adsorption part.

* * * * *